United States Patent Office 2,815,155
Patented Dec. 3, 1957

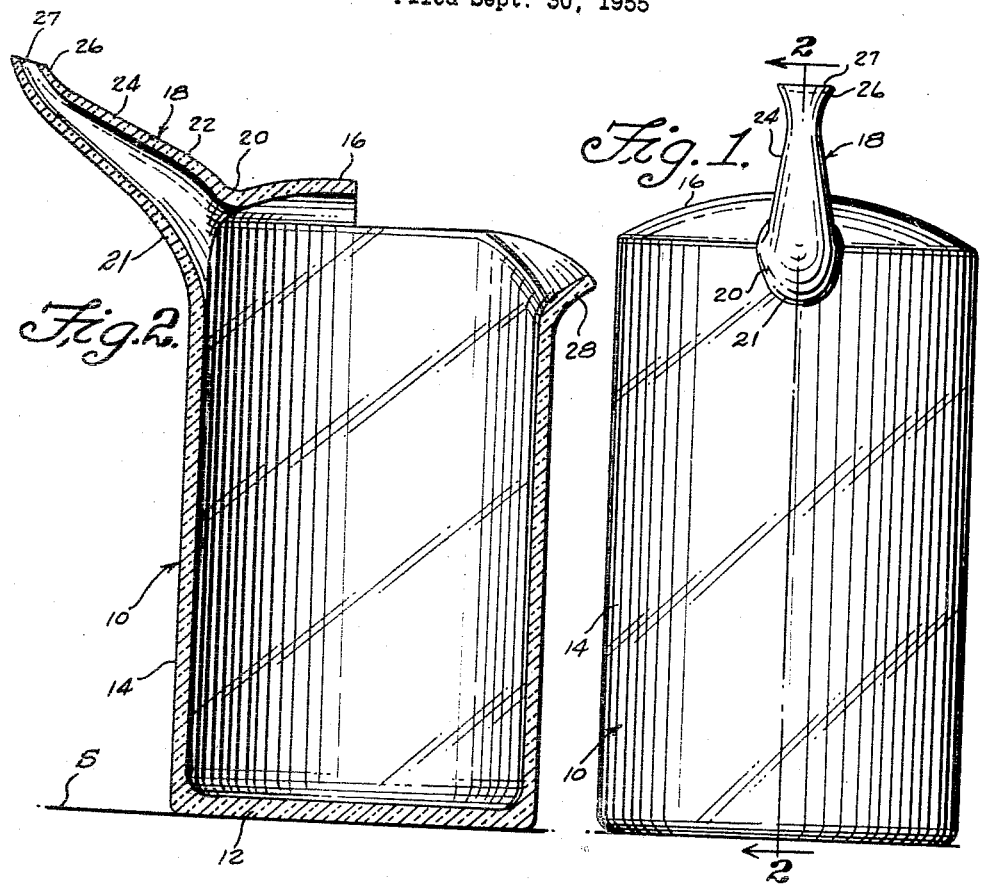
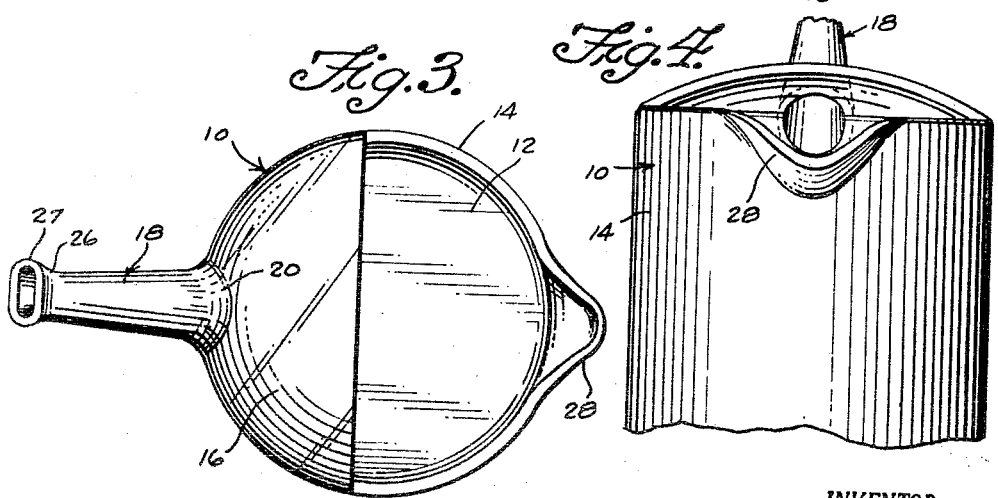

2,815,155

POURING SPOUT

John W. Roche, Whiskeytown, Calif.

Application September 30, 1955, Serial No. 537,688

3 Claims. (Cl. 222—478)

This invention relates to pouring spouts, adapted to be associated with various types of containers, and more particularly has reference to a spout the main purpose of which is to more effectively control the pouring of liquid from the container.

Summarized briefly, the invention comprises a spout tapering in the direction of its outer end and connected in communication at its base end with the interior of the container, the spout having in a preferred embodiment a slight bend intermediate its ends and being formed with an outlet end portion which is lightly flared, is longitudinally curved so as to direct the outflow through the spout in a path generally paralleling the level of a previously poured liquid, and is flattened in a transverse direction so as to distribute said outflow properly over the surface of said previously poured liquid.

While the spout constituting the present invention has general utility in respect to the pouring of liquids, it is particularly well suited for use in the making of those types of cordials wherein cream is flowed onto the surface of a previously poured alcoholic beverage.

In making drinks of this type, the conventional practice followed by the greatest number of bartenders is to either use a spoon in flowing the cream onto the surface of the cordial, or to pour the cream from a container. This is unsatisfactory, particularly when one must mix drinks rapidly, due to the fact that extreme care must be taken to insure that the cream will not be intermixed with the previously poured cordial or liqueur, but will instead remain wholly upon the surface thereof.

One important object of the present invention is to so shape the pouring spout that that will be no drippage during the pouring, and so that, further, the flow of cream will be retarded during the pouring to such an extent as to insure that it will not flow too rapidly from the spout, even when the container is rapidly tipped to initiate the flow of the contents thereof out of the spout.

Another specific object of the invention is to so form the spout at its discharge end as to cause the cream flowing therefrom to be discharged in a path approximately paralleling the plane of the level of the previously poured cordial or liqueur, rather than directly into the cordial, thus to insure that the cream will flow onto the surface of the cordial, and will not be intermixed therewith.

Still another object is to form the flowing column of cream so that it will be flattened out within the plane of the surface of the previously poured cordial, thus to be distributed laterally in opposite directions as well as forwardly over the surface of the cordial.

Still another object is to form the spout in such a manner that it can be an integral part of a container.

Still another object is to provide a spout as described above which, as distinguished from conventional cream containers, will offer sanitary protection, ease in cleaning, and will eliminate refrigeration odors.

Yet another object is to provide a container having diametrically opposed spouts, one of which will be designed in the manner previously described, for slow pouring of the cream so that it will float on top of the previously poured cordial or liqueur, and the other of which will be designed for fast pouring, whenever the necessity for floating of the cream is not present.

Other objects will appear from the following description, the claims appended thereto, and from the annexed drawing, in which like reference characters designate like parts throughout the several views, and wherein:

Figure 1 is a front elevational view of a container formed according to the present invention;

Figure 2 is a vertical sectional view therethrough taken on line 2—2 of Figure 1;

Figure 3 is a top plan view of the container; and

Figure 4 is a fragmentary elevational view of the container as seen from the right of Figure 2.

A container having a spout formed according to the present invention has been generally designated at 10, and can be formed of a desired material, such as plastic, glass or the like. The container includes a flat, circular bottom 12 integral at its periphery with an upstanding, cylindrical side wall 14. The particular shape of the body of the container may be varied as desired, that shown being merely illustrative of one container body which can be employed advantageously in practicing the invention.

Integral with the upper end of the side wall is a shield 16, and this is formed as a semi-circular member, of upwardly concavo-convex formation, overlying approximately half the upper end of the container as shown in Figure 3.

Formed integrally with the upper end of the side wall and with the shield is a spout 18 having a generally tapering formation, the larger end of the spout being disposed at the base 20 thereof. The spout communicates at its base, as shown in Figure 2, with the interior of the container.

Adjacent the base end of the spout, the spout is curved toward the horizontal as indicated by the numeral 21, the radius of curvature sloping upwardly and outwardly as seen in Figure 2. The spout at junction area has a bend 22, and from the bend the spout is curved upwardly toward the vertical as indicated by the numeral 24, the radius of curvature sloping upwardly and outwardly as also seen in Figure 2. The end 26 of the spout has an end edge 27 which is beveled on a slope extending downwardly toward the base end 20 of the spout.

By reason of this construction, when the container is tipped to the left in Figure 2, the contents thereof will pass through the spout 18, and if, for example, the container is held approximately horizontally, the flow out of the discharge end of the spout will initially move outwardly in an approximately horizontal path, so as to flow onto the level of the previously poured cordial without danger of being intermixed with the same. At the same time, the transversely flattened formation of the nozzle-like end portion 26 insures the flattening of the effluent as it passes out of the spout, so as to reduce the thickness of the flowing column of the liquid, thereby to still further insure that the liquid will be properly floated upon the surface of the beverage. This desirable result is obtained by the particular inclination of the nozzle-like end portion relative to the remaining part of the spout, by the beveling of the end edge of the spout, and by the flared, flattened formation of the portion 26. The shield of course prevents the liquid from pouring over the top edge of the container side wall during the operation.

The beveling of end edge 27 has the desirable characteristic that when the tip of the spout is placed against the side of a cordial glass, the side of the glass and the end edge 27 will be at an acute angle to one another, and will assure against intermixing of the poured liquid with that already in the glass. The particular bevel of the end edge of the spout prevents an air lock and serves the purpose of a spoon, since the spout tip is rounded to fit the inside of the cordial glass and form a block against the cream dropping directly onto the cordial already in the glass, the cream instead spreading out in opposite directions over the surface of the cordial.

The compoundly curved formation of the spout 18, additionally, has the desirable effect of causing the flowing liquid to move through a slightly tortuous path, thus retarding the flow of the liquid as it passes through the spout.

Diametrically opposite the spout 18 there is formed upon the container, at the upper end thereof, a speed spout 28, which can be used to permit the rapid pouring of liquids, whenever the necessity of floating the liquid upon the surface of a beverage is not present.

If desired, the spout 18 can be engaged in a cork stopper of a funnel, so as to permit the contents of said bottle to be poured in the same manner as the contents of the container shown would be poured when the spout 18 is being used. This is believed to be sufficiently obvious as not to require special illustration herein, and of course, the same structural and functional characteristics would be present in such an embodiment of the invention. Further, the speed spout might be eliminated on the container in some commercial embodiments, so as to provide a container which is used mainly for the flowing of cream onto cordials or liqueurs, although as will be appreciated the addition of the speed spout represents so small an additional expense in the manufacture of the container as to make the same worthwhile in any event.

Also, it is believed that it is also sufficiently apparent as not to require special illustration that a removable cap would be used for the spout, to prevent dirt or other foreign matter from entering the same, thus to provide for effective sanitation when the container is not in use, and the container in this event might also be provided with a cover to effect complete closing of the same under these circumstances.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A container comprising an upstanding, cylindrical body formed open at its upper end; and diametrically opposed pouring spouts upon the upper end of the container, one of said spouts being formed as a tubular body having a discharge end and a base and connected in communication with the interior of said container, a trough-like projection formed upon the upper end of the side wall of the container, said spouts being respectively adapted for slow and fast pouring of liquids.

2. The combination, with an upstanding, cylindrical container, of a shield rigid with the container and overlying substantially half the cross sectional area of the container; and a spout integral with said shield and container at the upper end of the container, said spout being formed as a tubular body having a discharge end and a base and connected in communication with the interior of said container, the body adjacent the base end being curved toward the horizontal with the radius of curvature sloping upwardly and outwardly, there being a bend in said body at its mid-point and from the bend the body being curved upwardly toward the vertical with the radius of curvature sloping upwardly and inwardly, the discharge end of said body being beveled on a slope extending downwardly toward the base end of the body.

3. A pouring spout for a container comprising a tubular body having a discharge end and a base end adapted for connection in communication with the interior of the associated container, the body adjacent the base end being curved toward the horizontal with the radius of curvature sloping upwardly and outwardly, there being a bend in said body at its mid-point and from the bend the body being curved upwardly toward the vertical with the radius of curvature sloping upwardly and inwardly, the discharge end of said body being beveled on a slope extending downwardly toward the base end of the body.

References Cited in the file of this patent
UNITED STATES PATENTS

| | | |
|---|---|---|
| 900,644 | Von Bayer | Oct. 6, 1908 |
| 1,362,186 | Price | Dec. 14, 1920 |
| 1,779,615 | O'Brien | Oct. 28, 1930 |
| 2,442,047 | Kemper | May 25, 1948 |